United States Patent

Narayanan et al.

[11] Patent Number: 5,768,457
[45] Date of Patent: Jun. 16, 1998

[54] MULTILAYERED CONNECTOR PADS FOR SUPPORTING BUTT-JOINED OPTICAL ARRAYS

[75] Inventors: Chellappan Narayanan, North Plainfield; Herman Melvin Presby, Highland Park, both of N.J.

[73] Assignee: Lucent Technologies Inc., Murray Hill, N.J.

[21] Appl. No.: 565,527

[22] Filed: Nov. 30, 1995

[51] Int. Cl.$^6$ ..................................................... G02B 6/26
[52] U.S. Cl. ........................................................ 385/50
[58] Field of Search ........................... 359/83, 88; 385/14, 385/39, 88, 89, 50; 372/8, 30, 38, 50, 109, 92; 257/81, 88, 98, 99; 437/2

[56] References Cited

U.S. PATENT DOCUMENTS 4,892,377  1/1990  Randle et al. .............................. 385/39
5,208,885  5/1993  Dragone et al. ........................... 385/49
5,371,818  12/1994  Presby ...................................... 385/49
5,497,258  3/1996  Ju et al. .................................... 359/83

*Primary Examiner*—Akm E. Ullah

[57] ABSTRACT

In many assembly applications of optical arrays, a bridging member is bonded to the arrays to hold them securely. It has been found that a pad made of layers of glass and silicon provides an efficient heat transmitting structure for this purpose. Because glass is absorbent to laser radiation at 10.6 μm, it absorbs all the incident laser radiation, and imparts the heat generated to the silicon, which transmits it uniformly over its entire surface. The heat can then be used to melt solder or to heat-cure an adhesive, thereby affecting a robust mechanical bond in an efficient and rapid manner.

9 Claims, 2 Drawing Sheets

5,768,457

1

MULTILAYERED CONNECTOR PADS FOR SUPPORTING BUTT-JOINED OPTICAL ARRAYS

TECHNICAL FIELD

This invention relates to connector chips for supporting butt-joined components such as arrays of aligned optical transmission paths, including integrated optical circuits (IOCs) and optical fibers.

BACKGROUND OF THE INVENTION

Advances in the design and fabrication of integrated optical circuits have made such devices extremely attractive candidates for use in optical transmission systems. However, it has been recognized that if IOCs are to be incorporated into fiber communication systems, a practical and commercially viable system of coupling such circuits to glass fibers must be devised. At present, the glass core waveguides of integrated optical devices, made using doped silica deposited on a silicon substrate, are normally butt-coupled to arrays of input and output optical fibers by means of a bonding material, such as a UV or heat cured epoxy. Such butt-coupled arrangements, however, are not particularly strong. In U.S. Pat. No. 5,208,885, issued May 4, 1993, and assigned to applicants' assignee, a more reliable fiber-waveguide butt-coupling arrangement is described in which a glass is used to fuse the fibers to the waveguides. More recently, in U.S. Pat. No. 5,371,818, issued Dec. 6, 1994, and assigned to applicants' assignee, a method for directly fusing optical fibers to optical waveguides, without the use of additional molten glass, is described.

While both of these latter methods of butt-coupling optical wavepaths are much superior to those employing epoxies, the resulting joints still require additional reinforcement and protection to make them robust to handling, and environmentally stable. To this end, the use of bridging connector pads is disclosed in U.S. patent application Ser. No. 08/350,869, filed Dec. 7, 1994, and assigned to applicants' assignee. In accordance with the teaching of this application, the arrays are first actively aligned. Following alignment, one or more bridging connector pads are secured to the arrays to produce a sturdy, stable optical and mechanical connection.

In a preferred embodiment, described in the above-identified application, the pads are soldered to the arrays and to each other. Heat, for melting the solder, is obtained from a hot-air torch. While this proved satisfactory for some applications, a hot-air torch is an inefficient source of heat in that it tends to heat up more of the area than is necessary. In addition, for some applications, the added heat can damage the optical devices being secured.

It is, accordingly, an object of the present invention to control the distribution of heat applied to optical arrays through bridging connector pads. More generally, it is an object of the invention to provide greater support for any type of butt-coupled components.

SUMMARY OF THE INVENTION

To achieve the above stated objective, the present invention takes advantage of some of the properties of glass and silicon. For example, whereas glass is fully absorbent of $CO_2$ laser radiation at 10.6 μm, it is an excellent insulator. Silicon, by contrast, is largely transparent to $CO_2$ radiation, but is an excellent conductor of heat. By combining the properties of both of these materials, a more effective connector pad is obtained.

2

In a first embodiment of the invention, the connector pad comprises a silicate glass coated rectangular silicon chip. Upon exposure to a $CO_2$ laser, all the radiant energy is converted to heat by absorption in the glass. This occurs within the depth of a few microns. The heat is then uniformly distributed by conduction over the entire surface of the silicon. The heat can be used to melt solder placed between the pad and the adjacent optical array, or to heat-cure an adhesive, thereby affecting a secure bond in an efficient and rapid manner. It is an advantage of the invention that the heat generated can be confined and is, therefore, less likely to damage any adjacent circuits.

Because glass and silicon have largely different coefficients of thermal expansion, heating the pad may cause it to bow. A simple way to avoid this is to place a second layer of glass on the opposite side of the silicon. Accordingly, in an alternative embodiment of the invention, both sides of the silicon chip are coated with a thin layer of glass.

DETAILED DESCRIPTION

Figure 1:
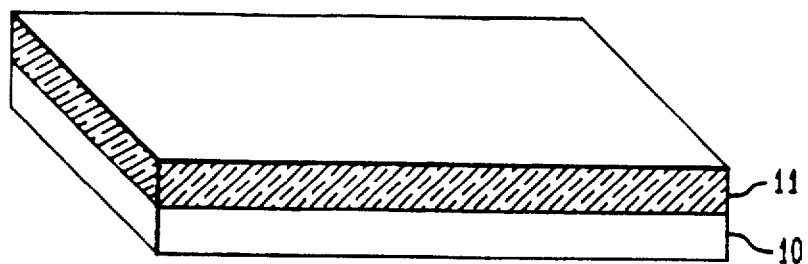
FIG. 1 shows a first embodiment of a connector pad for use in connection with the present invention.

Referring to the drawings, FIG. 1 shows a first embodiment of a connector pad, in accordance with the present invention, comprising a silicon chip 10 coated on one side with a layer of glass 11.

Figure 2:
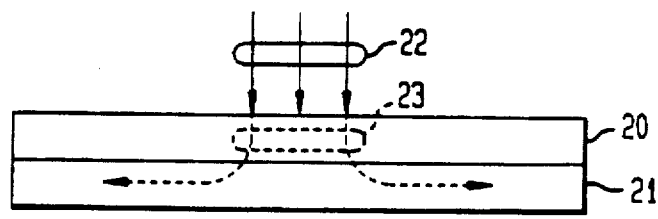
FIG. 2 shows the distribution of heat in the connector pad illustrated in FIG. 1.

As explained herein above, it is the unique combination of disparate properties of glass and silicon upon which the invention is based. This is illustrated in FIG. 2 which shows an end view of a connector comprising an upper glass layer 20 and a lower silicon layer 21. Upon exposure to $CO_2$ radiation 22, heat 23 is locally generated by the absorption of the radiant energy within the glass layer 20. The heat thus produced penetrates into the silicon wherein it is uniformly distributed due to the high conductivity of silicon.

Figure 3:
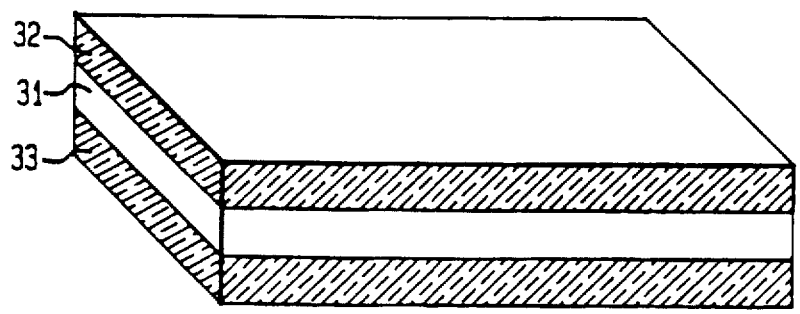
FIG. 3 shows a connector pad including a second layer of glass.

As noted above, because of the large difference in coefficients of thermal expansion, heat may cause a two-layered pad, of the type shown in FIG. 1, to bow somewhat. Accordingly, it may be advantageous in some applications to add a second layer of glass on the opposite side of the silicon, as shown in FIG. 3. In this embodiment, both sides of the silicon wafer 31 are coated with thin layers of glass 32 and 33.

Figure 4:
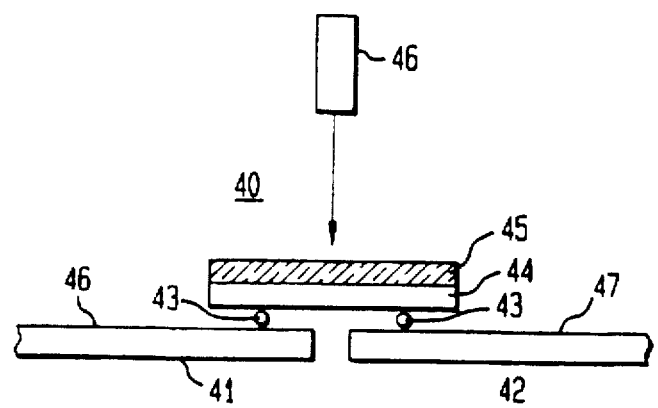
FIG. 4 shows the manner in which connector pads can be employed in accordance with the present invention.

FIG. 4 shows the manner in which a connector pad 40, comprising a layer of silicon 44 covered by a layer of glass 45, can be used to secure a pair of optical arrays 41 and 42 in accordance with the present invention. After the arrays 41 and 42 have been optically aligned, a bonding material 43 is applied along the top surfaces of adjacent ends of arrays 41 and 42. The bonding material may be a heat cured epoxy or solder. If the pad 40 is to be soldered to the optical arrays, the pad and the arrays are first metalized in order to accept the solder. This can be done using standard sputtering techniques. In this particular configuration, the areas of upper surfaces 46 and 47 under pad 40, and the silicon layer 44 are metalized.

With the arrays held in optical alignment, the glass surface 45 is exposed to radiation at 10.6 μm from an appropriate source, such as a $CO_2$ laser 46. As noted above, the glass, being fully absorbent at 10.6 μm, converts substantially all of the laser radiation to heat which is then transmitted by conduction throughout the silicon. In the illustrative embodiment, heat is thereby transferred to the solder which is melted to affect a bond with the optical arrays.

Employing the above-described technique, solder bonds have been made in less than five seconds with 18 watts of $CO_2$ laser power. Epoxy bonds were made in between two and three seconds with about five watts of average laser power.

A typical connector pad, made of silicon and silicate glass, has cross-sectional dimensions of 6 mm by 4 mm, and a thickness of 25 mils. Larger pads can be made, if required. However, larger pads will require more laser power to achieve the same heat density throughout the pad.

Figure 5:
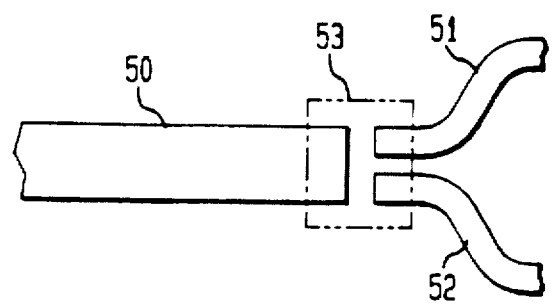
FIG. 5 shows an alternate optical arrays configuration.
Figure 6:
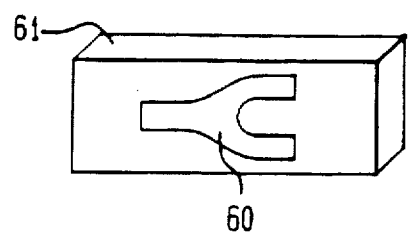
FIG. 6 shows a connector pad specifically patterned to the array configuration of FIG. 5.

An advantage of a connector pad of the type described is the flexibility it affords. For example, one may wish to divide the optical wavepaths in one array among two or more arrays. This is illustrated in FIG. 5, wherein the optical fibers contained in an array 50 are coupled among the fibers in two arrays 51 and 52. One could, in this situation, use a simple rectangular pad 53 to cover the adjacent ends of the three arrays. However, it may be more efficient and convenient to tailor the silicon pattern on the pad more precisely to the particular situation. Thus, for example, a pad in which the silicon is patterned as illustrated in FIG. 6 may be employed. In this embodiment the silicon layer 60 is deposited on a glass substrate 61 in the shape of a "Y", where each branch of the silicon is positioned to lie directly over one of the optical arrays.

As noted herein above, the use of connecting pads is not limited to supporting arrays of butt-connected optical wavepaths. More generally, connector pads, in accordance with the teaching of the present invention, can be employed wherever butt-joined components require added support. Thus, numerous and varied other arrangements can readily be devised by those skilled in the art in accordance with the teachings of the present invention.

What is claimed is:

1. A method of connecting a pair of arrays of optical wavepaths using at least one bridging connector pad having at least a first layer of material that is absorbent of radiation at a specified wavelength, and a second layer of material that is conductive of heat, comprising the steps of:

optically aligning the respective optical wavepaths of said arrays;

placing a bonding material between a portion of an exterior surface of each of said aligned pair of optical arrays and the heat conductive layer of said connector pad;

and exposing the absorbent layer of material of said pad to radiation at said specified wavelength.

2. The method according to claim 1 wherein said first layer is glass, said second layer is silicon and said glass layer is exposed to radiation from a $CO_2$ laser.

3. The method according to claim 1 wherein said pad comprises a glass covered rectangular silicon wafer.

4. The method according to claim 2 wherein said glass is exposed to said radiation, and said silicon is bonded to said arrays.

5. The method according to claim 1 wherein said bonding material is solder.

6. The method according claim 1 wherein said bonding material is a heat-cured adhesive.

7. A connection made in accordance with the method of claim 1.

8. A method of connecting butt-joined components using connector pads having at least a first layer of material that is absorptive of radiation at a specified wavelength, and a second, shaped layer of material that is conductive of heat, comprising the steps of:

aligning said components end to end;

placing bonding material between an exterior surface of each of said aligned pair of components and at least one connector pad;

and exposing the absorptive layer of material of said pad to radiation at said specified wavelength.

9. A connection made in accordance with the method of claim 8.

* * * * *